May 11, 1965  C. B. AUSTIN  3,183,479
GUIDANCE SYSTEM FOR AIRCRAFT
Filed Nov. 13, 1962  2 Sheets-Sheet 1

APPROACH TOO HIGH

APPROACH CORRECT

APPROACH TOO LOW

CUT ENGINE

WAVE-OFF

INVENTOR.
CARL B. AUSTIN
BY
AGENT
ATTORNEY

May 11, 1965 C. B. AUSTIN 3,183,479
GUIDANCE SYSTEM FOR AIRCRAFT
Filed Nov. 13, 1962 2 Sheets-Sheet 2
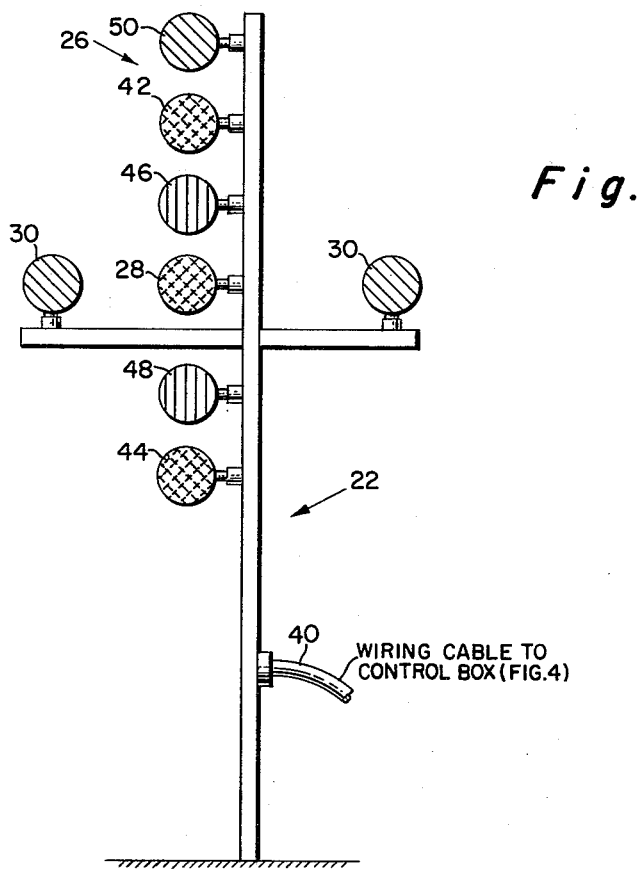
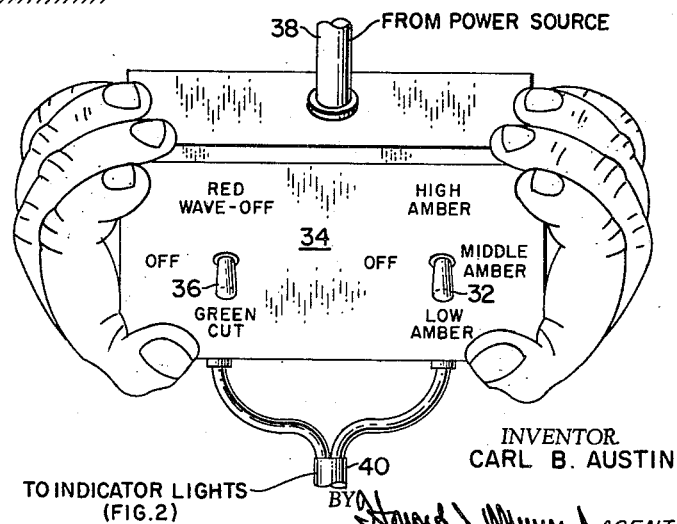
INVENTOR.
CARL B. AUSTIN

United States Patent Office

3,183,479
Patented May 11, 1965

3,183,479
GUIDANCE SYSTEM FOR AIRCRAFT
Carl B. Austin, 520 Carlson Drive, Lebanon, Oreg.
Filed Nov. 13, 1962, Ser. No. 237,408
5 Claims. (Cl. 340—26)
(Granted under Title 35, U.S. Code (1952), sec. 266)

The invention described herein may be manufactured and used by or for the Government of the United States of America for governmental purposes without the payment of any royalties thereon or therefor.

This invention relates to an optical indicating device, and more particularly to a display apparatus for visually presenting to the pilot of an aircraft information respecting the proper approach angle for the safe landing of such craft on an area of limited size.

Very little difficulty is normally experienced by aircraft pilots in landing their craft on the usual type of commercial or military airfield, since the length of the runways is normally ample to accommodate the requirements of any particular aircraft to which landing clearance has been given. However the same is not necessarily true of mobile landing platforms or decks such as are found on modern aircraft carriers, such decks seldom exceeding 900 feet in length. In spite of the arresting gear which is designed to intercept and rapidly decelerate an aircraft following touch-down it is extremely important that the entire landing operation follow precise standards, as otherwise damage to the aircraft and/or injury to the pilot is likely to occur.

One of the earliest methods designed to guide the pilot toward a safe landing on an aircraft carrier (and which method is still extensively employed) utilizes the services of an individual who is trained to convey visual information to the pilot of the aircraft with respect to the craft's position. This individual, usually designated the Landing Signal Officer (LSO), stands to one side of the runway and signals the pilot by means of small paddles held in each hand. Obviously the effectiveness of such a method depends upon many factors, such as the skill of the LSO, the experience of the pilot and both the weather and sea conditions existing at the same time of the landing operation. This particular method of guiding a pilot to a safe landing is still used under favorable conditions, but the increasing landing speeds of jet aircraft reduces the available time during which signals may be given to a period so short that it is frequently impossible to convey all of the information required by the pilot.

In recognition of this deficiency in the above-described procedure, an optical system has been heretofore devised which more or less automatically conveys information to the pilot and eliminates the necessity for the LSO to "wave-in" the aircraft. This optical system incorporates a mirror positioned to one side of the runway and oriented at an angle thereto so as to present to the pilot of an approaching aircraft the image of a fixed light source arranged in front of the mirror in such a position that light therefrom is reflected to the pilot. The path defined by the reflected light is chosen to generally coincide with the optimum aircraft approach angle when the image of the light source appears at a location on the mirror. Horizontal reference line is established at the mirror, and the pilot observes the image of the light source at a certain vertical position with respect to this reference line, the image appearing to move up or down in accordance with variations in the aircraft's angle of approach. If the angle of approach is too great (or, in other words, if the aircraft is too high) then the observed image will appear to lie above the reference line. Similarly, if the angle of approach is too small (meaning that the aircraft is too low) then the image will be below the reference line. Only with a correct approach angle will the image and the reference line substantially coincide in a horizontal sense.

Such a system finds wide use at the present time, but is subject to a number of disadvantages, the principal one of which is that the deck or runway of an aircraft carrier is subject to considerable movement as a result of rolling and pitching of the vessel. This causes the reflected light to correspondingly change its angle with respect to the horizon. This problem has been recognized, and attempts have been made to correct the condition by mounting the apparatus on a gyro-stabilized platform, but the disadvantages are not entirely eliminated because the amount of pitching and rolling of the deck is not conveyed to the pilot and he is therefore unable to take this factor into consideration in landing. Another drawback is that solar reflection occurs from the mirror when the sun is low on the horizon, and in extreme cases the entire mirror system is rendered practically invisible.

When gyros are used for stabilizing purposes, it is difficult to place complete reliance upon the mechanism, since such systems are highly prone to electrical and/or mechanical malfunction. Furthermore, their initial expense is quite high and maintenance cost almost prohibitive. A still further disadvantage arising from the use of a system of the type being described is that in the event of a breakdown or other damage to the apparatus, the only landing aid available for the pilot is a "talking-down" by the LSO with conventional paddles.

In any consideration of the advantages presented by the apparatus herein disclosed, it should be borne in mind that a number of physiological factors are also present in any operation involving the landing of an aircraft. Especially under the circumstances described, the pilot quickly becomes accustomed to the presence of the conventional reflecting device, and when the latter (commonly known as the "meat-ball") is for any reason inoperative, it is disconcerting to him to be forced to adapt to guidance in the form of manually-held paddles. Radio control is likewise not completely satisfactory, since instructions conveyed verbally are not interpreted as rapidly as visual instructions, and the precise amount of correction required is difficult to convey in this manner. It is extremely important that the pilot be given his position so that little or no "interpretation" is required for him to place it into effect. All of these objectives could be met through the use of a reliable visual display system that is capable of setting forth in definite fashion the direction and amount of any positional correction of the aircraft that is necessary to achieve a satisfactory landing operation. Along this line, it may be mentioned that at night, or during periods of restricted visibility, it is a common occurrence for the pilot to lose the "meat-ball" early in his approach, with no indication being provided as to the *direction* in which it has departed. The pilot is consequently at a complete loss as to whether he is too low, and, as a result, is quite likely to make an improper landing with possible serious consequences. If he is too high, by the time he discovers it (usually by the LSO telling him by radio) he is too close in to dive for the guide path, and, similarly, if he is too low, he flys level until he intercepts the path, but this interception usually occurs so close in that insufficient time remains to complete the landing without radical or usafe maneuvering close in to the carrier.

According to a feature of the present invention, an auxiliary visual landing system is provided which may supplement the standard mirror landing system in the event of a malfunction by the latter. An important characteristic of the system herein set forth is that the Landing Signal Officer is given full control over all aircraft landings, and is able to utilize his knowledge and experience in determining what information is to be presented to the pilot of an approaching craft. Basically, an artificial "meat-ball" is substituted for the present system, entirely eliminating the need for reflected energy. A characteristic of the disclosure is that the information to be conveyed to the pilot is *determined* by the LSO, and hence the pilot can rely upon such information as constituting a calculated evaluation of his approach pattern. If the deck of the aircraft carrier is pitching or rolling, the LSO simply supplies information through the apparatus under his control of a type that the LSO believes is proper under the circumstances. For landing at night and during times of limited visibility, the LSO observes the approaching aircraft, and leads the pilot to the glide path.

One object of the present invention, therefore, is to provide means for facilitating the safe landing of high-speed aircraft on an area of restricted size.

Another object of the invention is to provide a device for visually presenting to the pilot of an aircraft his location relative to a desired line in space, and the direction of any corrective action which should be initiated to bring the aircraft to such line.

A further object of the invention is to provide a system for facilitating the landing of high-speed aircraft upon a carrier, this means being manually controllable in response to an observation of the approaching aircraft by an individual stationed on the carrier and who is capable of predetermining the environmental conditions which will exist at the time the craft actually reaches the landing strip.

Other objects and many of the attendant advantages of this invention will be readily appreciated as the same becomes better understood by reference to the following detailed description when considered in connection with the accompanying drawings, wherein:

FIG. 2 is a front view of a preferred embodiment of the present concept, particularly showing the different chromaticity characteristics of the indications displayed by applicant's apparatus;

FIG. 4 is a perspective view of the manually-operable control unit of the present invention, by manipulation of which the various indicator lights of FIG. 2 may be selectively energized.

Figure 1:
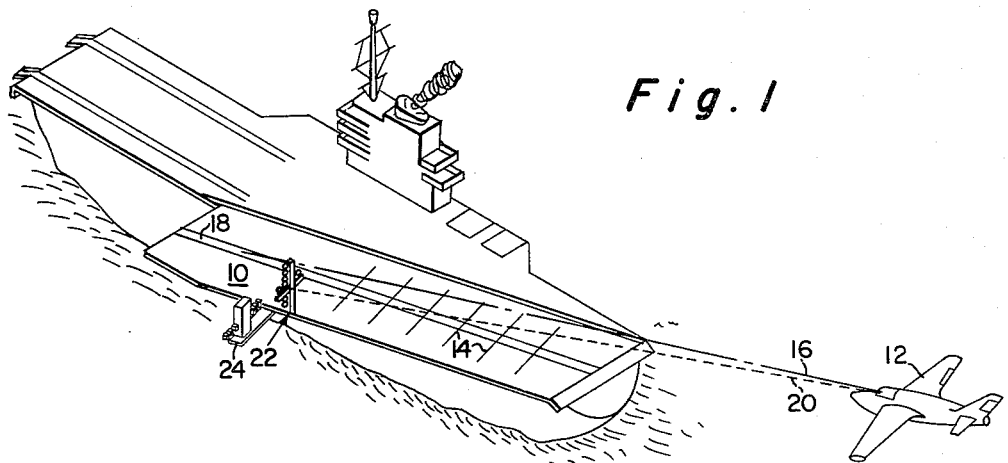
FIG. 1 is a perspective view of an aircraft carrier on which has been mounted a visual guidance system designed in accordance with a preferred embodiment of the present invention.

Referring now to the preferred embodiment of applicant's invention set forth in the drawings, there is shown an aircraft carrier of the type having an angled deck 10 which allows an aircraft (such as designated by the reference numeral 12) to land at the same time that others are being catapulted from another portion of the deck. In the usual fashion, a number of wires forming part of a standard arresting gear are shown by the reference numeral 14 as stretching across the landing area. The broken line 16 is representative of the aircraft pilot's line-of-sight to the center strip 18 of the landing area, while a further broken line 20 represents the pilot's line-of-sight to an indicating device 22 fixedly mounted on the aircraft carrier to one side of the landing deck 10.

The indicating device 22 of FIG. 1 comprises a plurality of selectively-energizable datum lights combined in a particular manner with a pair of constantly-energized reference lamps, and the relationship of these elements will be more clearly understood from the description of the operation of the arrangement illustrated in FIG. 2 of the drawings. It might be mentioned at this point, however, that the aircraft landing system to be described herein is intended to be employed in conjunction with other apparatus which is now more or less standard equipment on many naval vessels. As an aid in understanding the manner in which applicant's concept is coordinated with this previous equipment, reference is made to FIG. 1, which shows a visual position-indicating apparatus 24 located to one side of the landing area 10 and in the general vicinity of the unit 22. This previously-known device 24 includes a vertically-mounted mirror which faces the pilot of the approaching aircraft 12, such mirror being supported upon a platform so as to be rotatable through a limited angle about a horizontal axis. The platform upon which the mirror is mounted is usually stabilized with reference to the horizon by a suitable gyro unit (not shown) to compensate for pitching and rolling movement of the ship. The above details of the apparatus 24 form no part of the present invention, and are set forth in Patent No. 2,784,925 issued March 12, 1957, to H. C. N. Goodhart.

It is helpful from the standpoint of the present invention to recognize that this presently-known apparatus 24 has incorporated therein a series of horizontally-arranged indicator lights located to each side of the central mirror and approximately midway between its upper and lower extremities. These reference lights serve to establish a horizontal reference level as seen by the pilot of aircraft 12, so that the particular indications provided by the associated mirror may be positionally coordinated therewith.

This above-mentioned patent to Goodhart describes a system yielding an image commonly described in naval terminology as a "meat-ball." By reflection of light from a fixed source mounted aft of the mirror, the apparent location of the source (that is, the image thereof) will possess a vertical position dependent upon the height of aircraft 12 with respect to a predetermined proper glide path. Under many conditions this "meat-ball" arrangement operates satisfactorily, but when the deck of the carrier is pitching to any appreciable degree, the mirror becomes extremely unreliable, and the landing of aircraft 12 is usually accomplished by the Landing Signal Officer "talking" the pilot into a favorable position.

To eliminate this deficiency in the known arrangement, means are provided in the present disclosure for placing the information given to the pilot under the direct control of the LSO. Basically, an *artificial* meatball is substituted for the unit 24 when the latter is for any reason inoperative, and visual information is given to the pilot of the manner in which the LSO is evaluating his approach. If the deck is pitching, the LSO estimates from his background knowledge and experience where he believes the pilot *should* see the artificial meatball. It should be emphasized, however, that this substitution of applicant's concept for the presently-installed equipment is to be made only when the latter is inoperative for any reason, such as weather conditions or electrical and mechanical malfunctions.

The aircraft guidance system of the present invention constitutes in effect an *artificial* meatball, consisting of a vertical row of lamps shown in detail in FIG. 2 and generally designated by the reference numeral 26. As shown, six lamps are arranged in vertical alignment, and provision is made whereby these lamps may be selectively energized by operation of switches under the control of the LSO. Although a more complete description of the manually-operated selector mechanism will be set forth in connection with FIG. 4, it may be mentioned at this time that the LSO may, for example, illuminate the lamp 28 when the aircraft 12 is approaching along the correct glide path. To properly convey such information to the aircraft pilot, the lamp 28 is assigned a particular chromaticity characteristic, in this case, amber. It will be noted from FIG. 2 that this particular lamp 28 is horizontally aligned with the two reference lamps 30, so that when the pilot is in a correct approach position, the indication displayed to him by the apparatus of FIG. 2 is essentially the same position-wise as he would receive from the conventional "meatball" apparatus 24 of FIG. 1 were the latter operating. The only difference between the indications under consideration is that in applicant's concept the light issuing from the lamps 28 and 30 is colored in order that the information displayed at any particular time may be readily distinguished from information displayed during other instants of time by selective illumination of the remaining lamps.

Figure 3B:
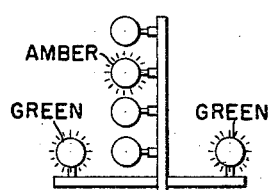
FIGS. 3a through 3e depict various conditions of illumination of the signal lights of applicant's invention, by means of which different indications may be displayed.
Figure 3A:
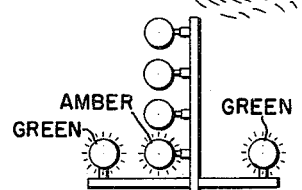

When the aircraft pilot is determined by the LSO to be in a correct position, therefore, visual information such as shown in FIG. 3a will be given, the three illuminated lamps lying in a horizontal plane. This represents a determination by the LSO that the aircraft 12 is on the prescribed glide slope. The indication is effected through the manipulation of a toggle switch 32 extending from a control unit 34 intended to be manually held between the hands of the LSO while observing the approach of aircraft 12. The manner in which the control unit 34 is to be held by the LSO for substantially instantaneous actuation is shown in FIG. 4, the toggle switch 32 being readily actuatable by the right thumb of the LSO while a second toggle switch 36 is similarly actuatable by the LSO's left thumb. The control unit 34 receives energy from a power source (not shown) over cable 38 and conveys control energy to the indicator apparatus of FIG. 2 over the cable 40.

However, should the LSO determine the aircraft 12 to be above the prescribed glide path, he will actuate the toggle switch 32 by his right thumb and illuminate the lamp 42 (FIG. 2). This lamp 42, like the lamp 28, has an amber lens, and accordingly the situation of FIG. 3b will prevail. At the same time the lamp 28, which may have been previously illuminated, will be deenergized. Positionally speaking, the information now presented to the aircraft pilot is identical to that which he would receive if he were high on the glide slope when utilizing the conventional landing mirror arrangement 24 of FIG. 1.

Figure 3C:
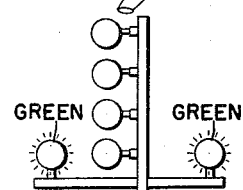

On the other hand, if the LSO determines the aircraft 12 to be below the prescribed glide path, he will actuate the toggle switch 32 to its lower position and energize the lamp 44 (FIG. 2). This lamp 44, like the lamps 28 and 42, also possesses an amber lens, and so the conditions of FIG. 3c prevail, the lamp 42 being deenergized concurrently with the illumination of lamp 44. Again, the presentation is positionally identical to that given by the conventional device 24.

The toggle switch 32 is of conventional design, and closes but one circuit at any particular time. Consequently, it is not possible to convey misleading information by illumination of more than one of the amber lamps 28, 42 and 44. It will be noted also that when the switch 32 is in "off" position no amber lamp is energized. The two green horizontal reference lights 30 remain constantly illuminated throughout use of the device 22. There is no provision on control unit 30 for deenergizing such lights.

Under certain conditions the LSO may determine that the approaching aircraft 12 should be given a "wave-off." Accordingly, by using his left thumb, he manipulates the toggle switch 36 to its upper position, which acts to intermittently energize the two wave-off lights 46 and 48, the lenses of which are each colored red. This results in a visual presentation to the aircraft pilot approximately similar to that which he would receive if he were being given a "wave-off" by the conventional system 24. To bring about the intermittent operation of lamps 46 and 48, the control unit 34 incorporates a standard flasher (not shown) of any suitable type.

Figure 3E:
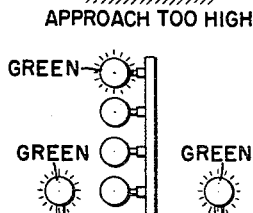
Figure 3D:
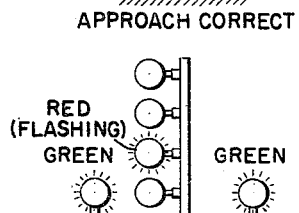

If the aircraft 12 is of the propeller type, it may require a "cut" signal to reduce its engine power. For this purpose, the toggle switch 36 may be manipulated to its lower position to illuminate the uppermost lamp 50 of the vertical group 36. This lamp 50 is provided with a green lens, and hence the presentation resulting from such an energization of lamp 36 will be substantially identical to that now given an aircraft pilot by the apparatus 24. The respective "wave-off" and "cut engine" indications are pictorially shown in FIGS. 3d and 3e, respectively, of the drawings.

Although certain chromaticity characteristics have been arbitrarily assigned to the various signal lamps 28, 30, 42, 44, 46, 48 and 50 of applicant's invention, it should be emphasized that the particular colorations shown for the various lamp lenses are subject to variation as long as the position and arrangement thereof is substantially similar to that illustrated and described. It is only essential that there be some means for distinguishing between the indications so that the aircraft pilot is not mislead by the information displayed. Applicant's invention, therefore, makes use not only of the relative position between the reference lights 30 and the various datum lights included in the row 36, but also ensures against misinterpretation by assigning *different chromaticity characteristics* to the various datum lights, so that aircraft pilot has the added assurance provided by this color difference. This has proven to be important from a physiological standpoint.

Obviously many modifications and variations of the present invention are possible in the light of the above teachings. It is therefore to be understood that within the scope of the appended claims the invention may be practiced otherwise than as specifically described.

I claim:

1. A device for aiding the pilot of an aircraft to follow a correct approach path to touchdown on a landing area of restricted size, said device being controllable by an observer of said craft stationed in the vicinity of said landing area, said device comprising:

(a) a first row of selectively-energizable colored signal light sources arranged in substantially vertical alignment, adjacent light sources in said row having different chromaticity characteristics, and with the total number of different chromaticity characteristics of all of the light sources in said row being at least three, said row of signal light sources being located to one side of said landing area and facing in the direction from which said aircraft approaches;

(b) a second row of constantly-energized colored light sources each possessing a similar chromaticity characteristic which is identical to that of one of the light sources making up said first row, said second row of light sources being arranged in substantially horizontal alignment and disposed intermediate the extremities of said first row of vertically-aligned light sources;

(c) said second row of constantly-energized light sources constituting a reference level for signals displayed to the pilot of said aircraft through selective energization of the light sources comprising said first row;

(d) and switch means operable by said aircraft observer for selectively controlling the energization of the light sources comprising said first row to thereby convey to the pilot of said aircraft information concerning the position of his craft with respect to the correct approach path to said landing area.

2. A device according to claim 1, in which said switch means is operable by said observer to energize a colored light source in the lowermost portion of said first row, having a chromaticity characteristic identical to the chromaticity characteristic of all of the light sources making up said second row, when it is desired to convey to the pilot of said aircraft information to the effect that his plane is below the correct approach path to said landing area.

3. A device according to claim 1, in which said switch means is operable by said observer to energize a colored light source in the uppermost portion of said first row, having a chromaticity characteristic identical to the chromaticity characteristic of all of the light sources making up said second row, when it is desired to convey to the pilot of said aircraft information to the effect that his plane is above the correct approach path to said landing area.

4. A device according to claim 1, in which said switch means is operable by said observer to intermittently energize at least one colored light source of said first row having a chromaticity characteristic different from the chromaticity characteristic of all of the light sources making up said second row, when it is desired to wave-off the approaching aircraft, thus indicating to the pilot of such craft that no landing should at that time be attempted.

5. A device according to claim 4, in which said switch means is operable by said observer to energize the uppermost colored light source of said first row, said uppermost light source having a chromaticity characteristic different from the chromaticity characteristic of any other light making up said first row, when it is desired to indicate to the pilot of an approaching propeller air craft that he should cut his motor and reduce his speed prior to making touchdown on said landing area.

References Cited by the Examiner
UNITED STATES PATENTS
2,975,400   3/61   Ferguson et al. _____ 340—26

NEIL C. READ, *Primary Examiner.*